United States Patent [19]
Yanagimoto

[11] Patent Number: 5,868,341
[45] Date of Patent: Feb. 9, 1999

[54] HAND-HELD FILM WINDING DEVICE WITH MOVABLE GUIDE BAR

[75] Inventor: Takekazu Yanagimoto, Kanagawa, Japan

[73] Assignee: Fuji Photo Film Co., Ltd., Kanagawa, Japan

[21] Appl. No.: 661,360

[22] Filed: Jun. 11, 1996

[30] Foreign Application Priority Data

Jul. 31, 1995 [JP] Japan .................................... 7-194924

[51] Int. Cl.⁶ .................................................. B65H 23/26
[52] U.S. Cl. ...................... 242/548; 242/533.8; 242/545; 242/348.1
[58] Field of Search .............................. 242/348, 348.1, 242/348.4, 539, 533.8, 545, 546, 548; 396/407, 410

[56] References Cited

U.S. PATENT DOCUMENTS

| | | | |
|---|---|---|---|
| 1,087,996 | 2/1914 | Tessier | 242/348 X |
| 1,531,305 | 3/1925 | Nye | 242/348 X |
| 3,544,039 | 12/1970 | Lynch et al. | 242/539 X |
| 3,999,197 | 12/1976 | Iwashita et al. | 396/410 |
| 4,266,740 | 5/1981 | Ramos et al. | 242/533.8 X |
| 4,512,529 | 4/1985 | Kampf | 242/546 |
| 4,679,926 | 7/1987 | Suzuki et al. | 396/410 |
| 5,357,303 | 10/1994 | Wirt | 242/348.4 X |
| 5,524,843 | 6/1996 | McCauley | 242/533.8 |

*Primary Examiner*—Daniel P. Stodola
*Assistant Examiner*—Gregory J. Strimbu
*Attorney, Agent, or Firm*—Sughrue, Mion, Zinn, Macpeak & Seas, PLLC

[57] ABSTRACT

A film winding device comprises: a cartridge loading portion for holding a cartridge in which a photographic film is wound around a spool shaft and is accommodated so that the photographic film can be pulled out from and inserted into a photographic film insertion opening of the cartridge; guide bar which is provided to face the insertion opening of the cartridge loaded in the cartridge loading portion and around which a middle portion of the length of the photographic film pulled out from the cartridge is entrained; a driving member for rotating the spool shaft which is provided in the cartridge loaded in the cartridge loading portion so as to wind the photographic film pulled out from the cartridge into the cartridge; and a base portion connected integrally with the cartridge loading portion and having a casing in which the driving member is accommodated.

9 Claims, 6 Drawing Sheets

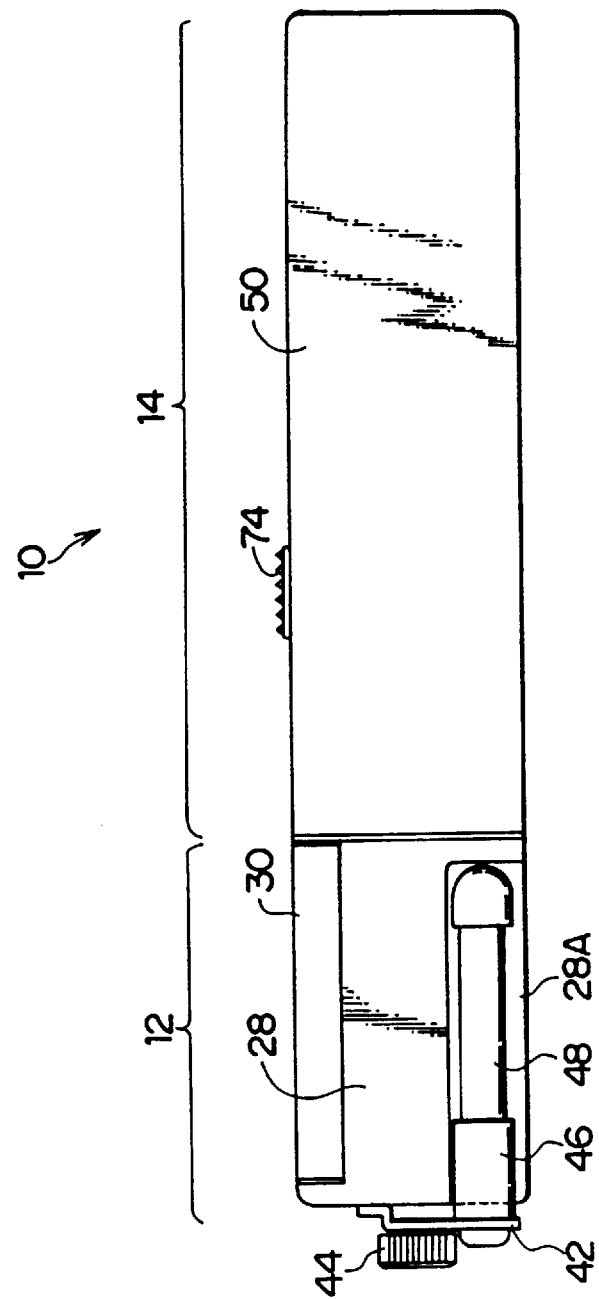

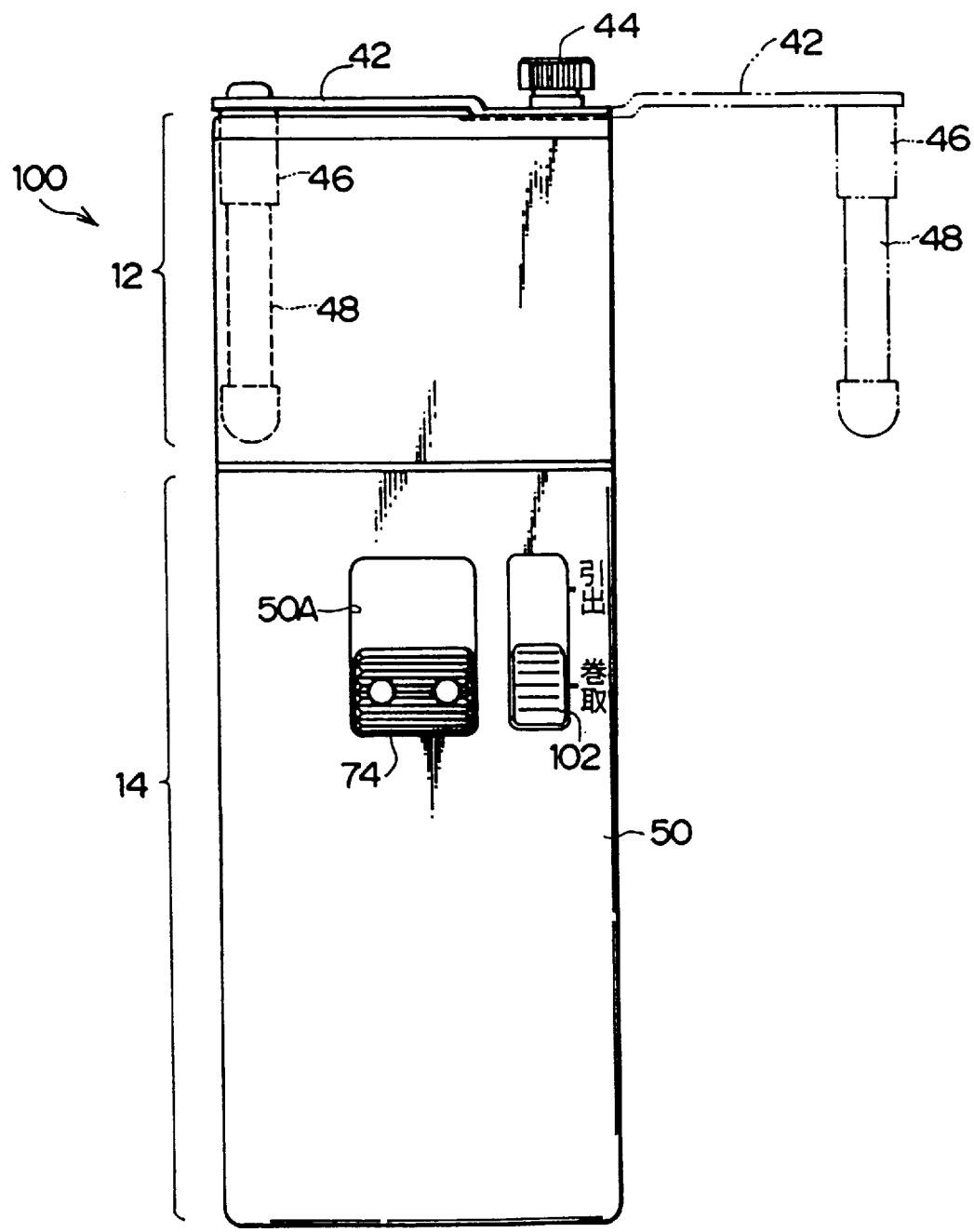

# HAND-HELD FILM WINDING DEVICE WITH MOVABLE GUIDE BAR

BACKGROUND OF THE INVENTION

1. Field of the Invention

The present invention relates to a film winding device for winding a photographic film, pulled out from a cartridge, around a spool shaft provided in the cartridge, in layers.

2. Description of the Related Art

An exposed photographic film (for example, a negative film) is brought in a development laboratory in a state of being wound in a case such as a cartridge. In the development laboratory, the negative film wound in the cartridge is pulled out therefrom and is subjected to development processing. The developed negative film is loaded on a film carrier of a printer and printing processing is effected in which an image recorded on the negative film is printed onto a photographic printing paper to prepare a photographic print.

The negative film which has been subjected to development processing is put in a negative film sleeve in the state of negative pieces into which the negative film is cut every a predetermined number of image frames (for example, every six frames), and thereafter, is returned to a customer together with photographic prints.

In recent years, there has been discussed a method in which a negative film subjected to development processing is wound in a cartridge and is returned to a customer without being cut into pieces. By storing the negative film in a non-cut state, for example, the negative film can be provided with a magnetic recording layer. In cases in which information regarding the time of photographing of the negative film, information regarding the time of printing, and the like are recorded on the magnetic recording layer, the information recorded on the negative film can be read out and utilized at the time of a subsequent printing operation or the like.

In the case in which the negative film is wound and accommodated in the cartridge, when extra prints of an image recorded on the negative film are made, the negative film must be pulled out from the cartridge. For this reason, a device for effecting printing an image of the negative film (i.e., a printer) needs a mechanism for winding the negative film in the cartridge as well as a mechanism for pulling out the negative film from the cartridge. Accordingly, a film carrier has been proposed for mounting the negative film to a printer for printing processing, having a mechanism for pulling out the negative film from the cartridge and a mechanism for winding the negative film back into the cartridge.

On the other hand, when only several frames among the images recorded on the negative film are enlarged to be greater than a standard size, a printing device provided for that particular purpose (a large enlarging device) is used. A carrier of the large enlarging device is provided such that various films can be mounted thereto, but it is difficult from a spatial point of view in the device to provide a mechanism for pulling out and winding the negative film out of and back into the cartridge. Accordingly, when the negative film accommodated in the cartridge is mounted in such a large enlarging device, the negative film must be pulled out from the cartridge manually.

In this case, this manual operation of pulling out the negative film from the cartridge is relatively easy. However, when the negative film pulled out from the cartridge is wound again in the cartridge, the negative film which is several meters in length must be wound around a small-diameter spool shaft of the cartridge by rotating the spool shaft. This operation of winding the negative film around the spool shaft requires much time and patience. Further, since substantial curling is generated in the negative film when it is in the cartridge, the operation of winding the negative film in the cartridge without damaging the negative film becomes troublesome.

SUMMARY OF THE INVENTION

In view of the above-described circumstances, it is an object of the present invention to provide a film winding device which allows an elongated photographic film, which has been manually pulled out from a cartridge, to be easily wound around a spool shaft.

A first aspect of the present invention is a film winding device comprising: a cartridge loading portion for holding a cartridge in which a photographic film is wound around a spool shaft and is accommodated so that the photographic film can be pulled out from and inserted into a photographic film insertion opening of the cartridge; a guide bar which is provided to face the insertion opening of the cartridge loaded in the cartridge loading portion and around which a longitudinal direction intermediate portion of the photographic film pulled out from the cartridge is entrained; a driving member for driving to rotate the spool shaft which is provided in the cartridge loaded in the cartridge loading portion so as to wind the photographic film pulled out from the cartridge in the cartridge; and a base portion connected integrally with the cartridge loading portion and having a casing in which the driving member is accommodated.

In accordance with the first aspect of the present invention, the film winding device is formed by the base portion and the cartridge loading portion and the cartridge from which the photographic film is pulled out is loaded in the cartridge loading portion. The photographic film pulled out from the cartridge is entrained around the guide bar. In this state, when the driving member is driven to rotate the spool shaft in the cartridge, the photographic film can be wound around the spool shaft and accommodated in the cartridge. Thus, it is extremely easy to wind the photographic film, which has been pulled out from the cartridge, around the spool shaft.

Further, since the film winding device is formed by the cartridge loading portion and the base portion in which the driving member is accommodated, it can be made small and portable.

A second aspect of the present invention is a film winding device in the first aspect of the present invention, which further comprises: a drive shaft which engages with the spool shaft of the cartridge by projecting into the cartridge loading portion, holds the cartridge at a predetermined position within the cartridge loading portion, and allows driving force of the driving member to be transmitted to the spool shaft.

In accordance with the second aspect of the present invention, after the cartridge has been fixed in the cartridge loading portion by the drive shaft, the driving force of the driving member is transmitted to the spool shaft of the cartridge. As a result, an operation of loading the cartridge to an operation of winding the photographic film can be successively effected. When winding of the photographic film in the cartridge has been completed, the cartridge is released from being held and can be removed accordingly.

Accordingly, it is possible for an operator to perform winding of the photographic film into the cartridge while holding the base portion in one hand, and in comparison with an operation of manually rotating the spool shaft, operating efficiency can be markedly improved.

A third aspect of the present invention is a film winding device in the first and second aspects of the present invention, which further comprises:

a drive switching member for causing the driving member to rotate reversely for a predetermined time.

In accordance with the third aspect of the present invention, the spool shaft can be reversely rotated for a predetermined time. Accordingly, when the cartridge from which the photographic film is not pulled out is loaded in the cartridge loading portion, the spool shaft can be rotated in a direction in which the photographic film is sent out from the cartridge and the leading end of the photographic film can be pulled out from the cartridge accordingly. This makes it possible to easily pull out the photographic film from the cartridge.

Further, since the driving member is reversely rotated only for the predetermined time, over-rotation of the spool shaft can be prevented. Further, it is possible to prevent reversal of the direction in which the photographic film is wound by further rotating the spool shaft in the state in which the photographic film has been pulled out from the cartridge substantially to its full length.

As described above, the film winding device of the present invention is constructed so that the photographic film can be easily wound in the cartridge loaded in the cartridge loading portion. Further, since the film winding device is of a simple structure formed by the cartridge loading portion and the base portion in which the driving member is provided, it can be made as a small-sized and portable one.

Further, in the film winding device of the present invention, since winding of the photographic film can be effected with the cartridge being easily fixed in the cartridge loading portion, it is possible for the operator to effect the film winding operation in a simple manner even with only one hand.

BRIEF DESCRIPTION OF THE DRAWINGS

FIG. 5 is a schematic side view when the film winder is seen from a side surface thereof opposite to that where an insertion opening is provided.

FIG. 6 is a schematic front view of a film winder according to the present invention, when seen from a side of a cover.

DESCRIPTION OF THE PREFERRED EMBODIMENTS

Figure 1:
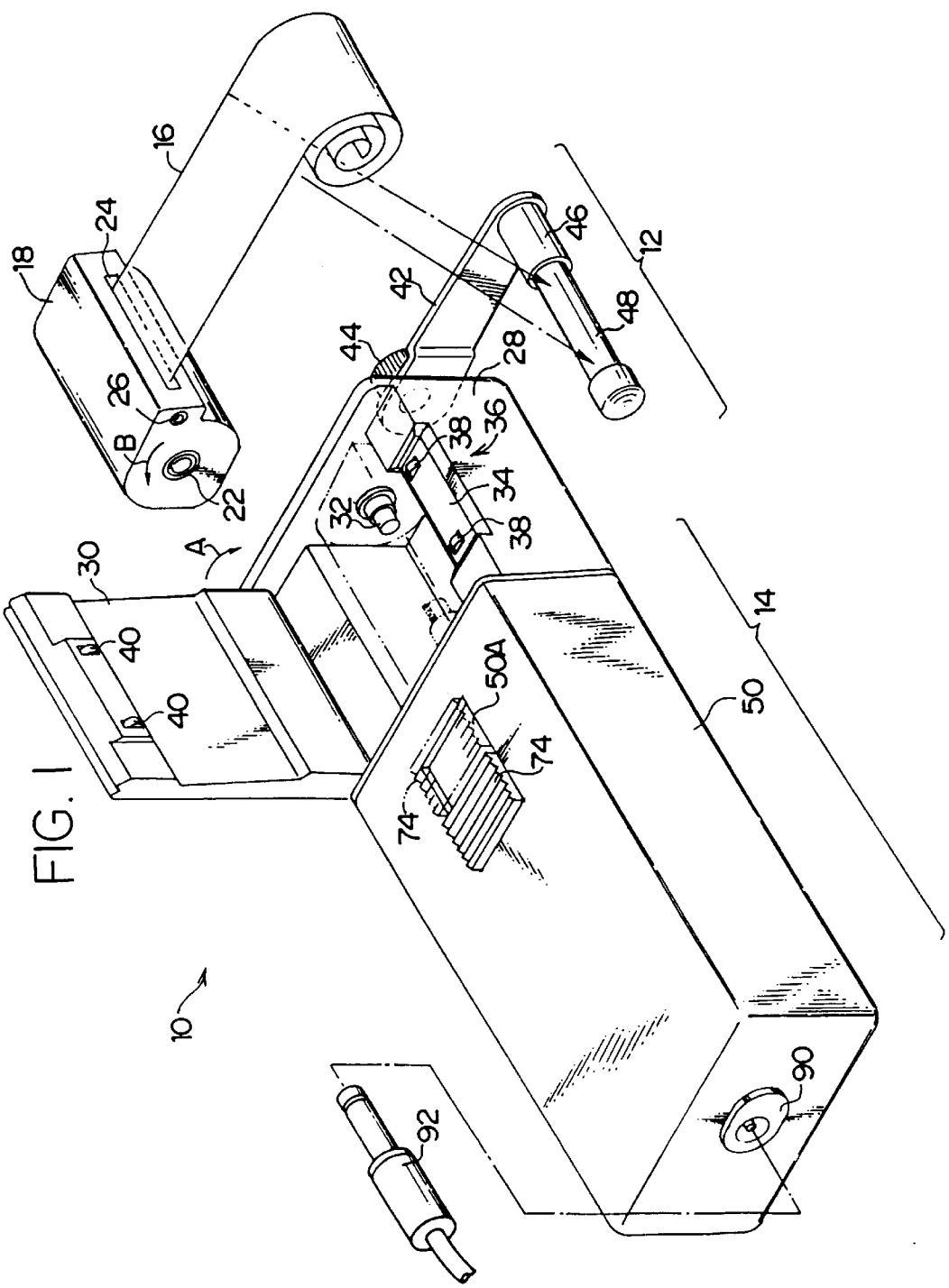
FIG. 1 is a perspective view showing a film winder according to an embodiment of the present invention.

FIG. 1 shows a film winder 10 which is a film winding device of the present invention. The film winder 10 is formed in the shape of a box of a rectangular parallelepiped, of which dimension in one direction is made longer than that of a direction perpendicular to the one direction. A cartridge loading portion 12 provided at one longitudinal-direction end of the film winder 10 is connected to and formed integrally with a base portion 14.

A cartridge 18 which carries an elongated photographic film 16 (hereinafter referred to as a "negative film 16") is loaded in the cartridge loading portion 12. A spool shaft 20 (see FIG. 2) is provided in an interior of the cartridge 18. Both end portions 22 of the spool shaft 20 in the axial direction thereof are exposed to an exterior of the cartridge 18, and the spool shaft 20 provided within the cartridge 18 can be rotated by rotating the end portions 22. The negative film 16 is accommodated within the cartridge 18 in such a manner that one longitudinal-direction end of the negative film 16 is engaged with the spool shaft 20 and the negative film 16 is wound around the spool shaft 20 in layers.

Further, the cartridge 18 is provided with an insertion opening 24 through which the negative film 16 passes. The negative film 16 is pulled out from and pulled into the cartridge 18 via the insertion opening 24. The insertion opening 24 of the cartridge 18 is usually closed by an unillustrated door and is allowed to be opened and closed by rotating a door shaft 26 connected to the door.

Figure 2:
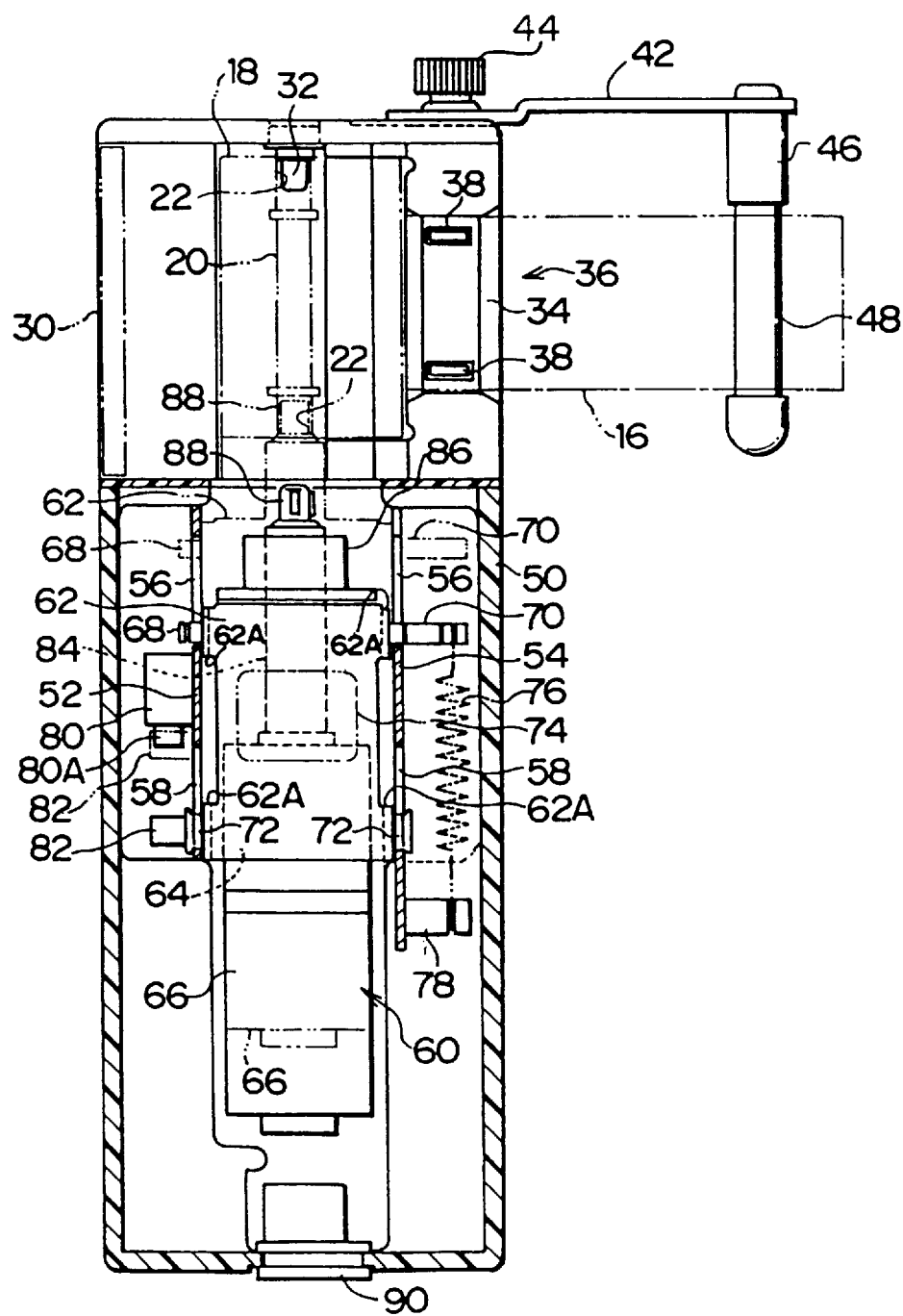
FIG. 2 is a schematic cross-sectional view of a film winder of which the base portion is cut away along the longitudinal direction thereof.

As shown in FIGS. 1 and 2, the cartridge loading portion 12 has a space in which the cartridge 18 is accommodated in an interior of a casing 28. Further, a cover 30 is provided on one side surface of the casing 28 (i.e., one of the facing side surfaces perpendicular to a direction of the thickness of the cartridge loading portion 12). The cover 30 is swingably connected to the casing 28 by an unillustrated shaft at one end thereof (in the direction indicated by arrow A in FIG. 1 and the direction opposite thereto). By swinging the cover 30 with the shaft being fixed as a support shaft, the casing 28 in which the cartridge 18 is accommodated is allowed to be opened and closed.

A shaft 32 is rotatably mounted at an inner surface of the casing 28 at one of the facing side surfaces which cross the longitudinal direction of the film winder 10 at right angles, in such a manner as to protrude toward the base portion 14. As shown in FIG. 2, the shaft 32 is provided to engage with the spool shaft 20 so as to be integrally rotatable therewith by being inserted into one of the end portions 22 of the spool shaft 20, which are exposed to the exterior of the cartridge 18.

The cartridge 18 is mounted in an interior of the casing 28 in a state in which the shaft 32 is inserted into one of the end portions 22 of the spool shaft 20. At this time, the insertion opening 24 of the cartridge 18 is provided to face in a direction opposite to that of the support shaft (not shown) of the cover 30. It should be noted that depressions and protrusions are formed on an inner surface of the casing 28 to conform to an outer shape of the cartridge 18 and when the cover 30 is closed, the cartridge 18 can be held at a predetermined position in an interior of the casing 28.

Further, as shown in FIG. 1, a stepped portion 34 is formed in the casing 28 of the cartridge loading portion 12 in such a manner as to face a surface of another end of the cover 30, and when the casing 28 is closed by the cover 30, a slit-shaped opening is formed. The slit-shaped opening allows the negative film 16 pulled out from the cartridge 18 accommodated within the casing 28, to be brought into a state of being pulled out from the casing 28 (the slit-shaped opening will be hereinafter referred to as an "insertion opening 36").

Feed rollers 38 are provided on the stepped portion 34 of the casing 28 to face non-image portions at both ends of the negative film 16 in the transverse direction thereof. Further, the cover 30 is provided with feed rollers 40 at positions facing the feed rollers 38. These feed rollers 38, 40 are provided as film holding members.

These feed rollers 38, 40 nip the negative film 16 which passes through the insertion opening 36 with the cover 30 closed and rotates together with movement of the negative film 16. At this time, the feed rollers 38, 40 cause an image plane of the negative film 16 to be moved apart from the vicinity of the insertion opening 36 and causes the negative film 16 to pass through the insertion opening 36 in such a manner that the negative film 16 does not contact the casing 28 or the cover 30. When the negative film 16 is inserted in the interior of the casing 28, tensile force is applied to the negative film 16 inserted in the interior of the casing 28 by the negative film 16 contacting and rotating the feed rollers 38, 40.

An arm 42 serving as a connecting member is connected to the casing 28 via a screw 44, which serves as a holding member provided at one longitudinal-direction end of the arm 42, at the side surface of the film winder 10 perpendicular to the longitudinal direction of the film winder 10. When the arm 42 is tightly screwed by the screw 44, the arm 42 can be connected to the casing 28 so as not to swing with respect to the casing 28. Further, when tightening of the arm 42 by the screw 44 is loosened, the arm 42 can be brought into a swingable state with a shaft of the screw 44 serving as the center of rotation.

A guide bar 46 is mounted at another end of the arm 42. One longitudinal-direction end of the guide bar 46 is fixed to the arm 42 and the guide bar 46 is formed to protrude toward the base portion along a direction substantially perpendicular to the longitudinal direction of the arm 42 and along the longitudinal direction of the film winder 10.

A guide portion 48 is formed at an intermediate portion of the guide bar 46 in the longitudinal direction thereof and the diameter of the guide portion 48 becomes smaller than that of each of both ends of the guide bar 46 in the longitudinal direction thereof. When the guide portion 48 is provided to face the insertion opening 36 of the cartridge loading portion 12 (i.e., when the longitudinal direction of the guide portion 48 substantially coincides with the transverse direction of the insertion opening 36), an intermediate portion of the negative film 16 pulled out from the cartridge 18 accommodated in the cartridge loading portion 12 can be entrained around the guide portion 48. At this time, since the longitudinal-direction end portions of the guide bar 46 each have a diameter larger than that of the guide portion 48, movement of the negative film 16 in the transverse direction thereof can be limited, and it is possible to prevent generation of a waved state or the like in the negative film 16 when the negative film 16 is wound in the cartridge 18.

Figure 3A:
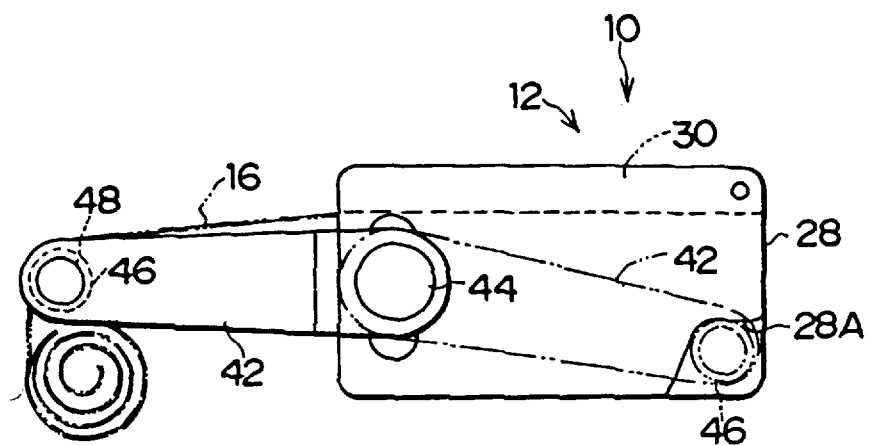
FIGS. 3A and 3B are respectively schematic views when a cartridge loading portion of the film winder is seen from a side surface thereof opposite to that where the base portion is provided, which show a negative film entrained around a guide bar.
Figure 3B:
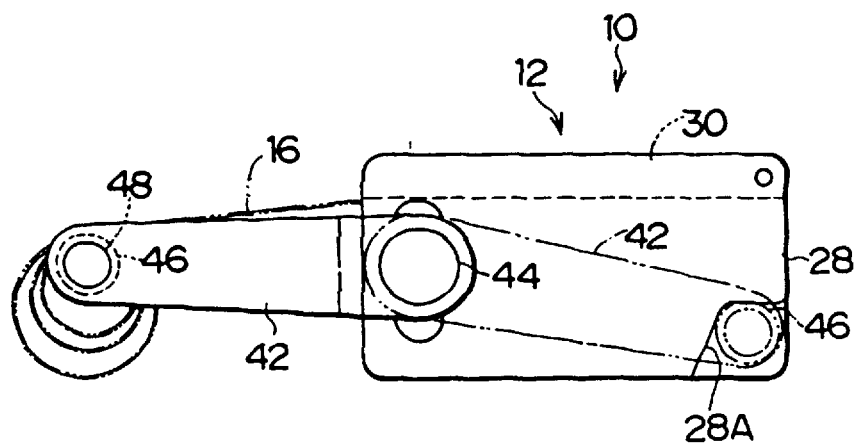
Figure 4:
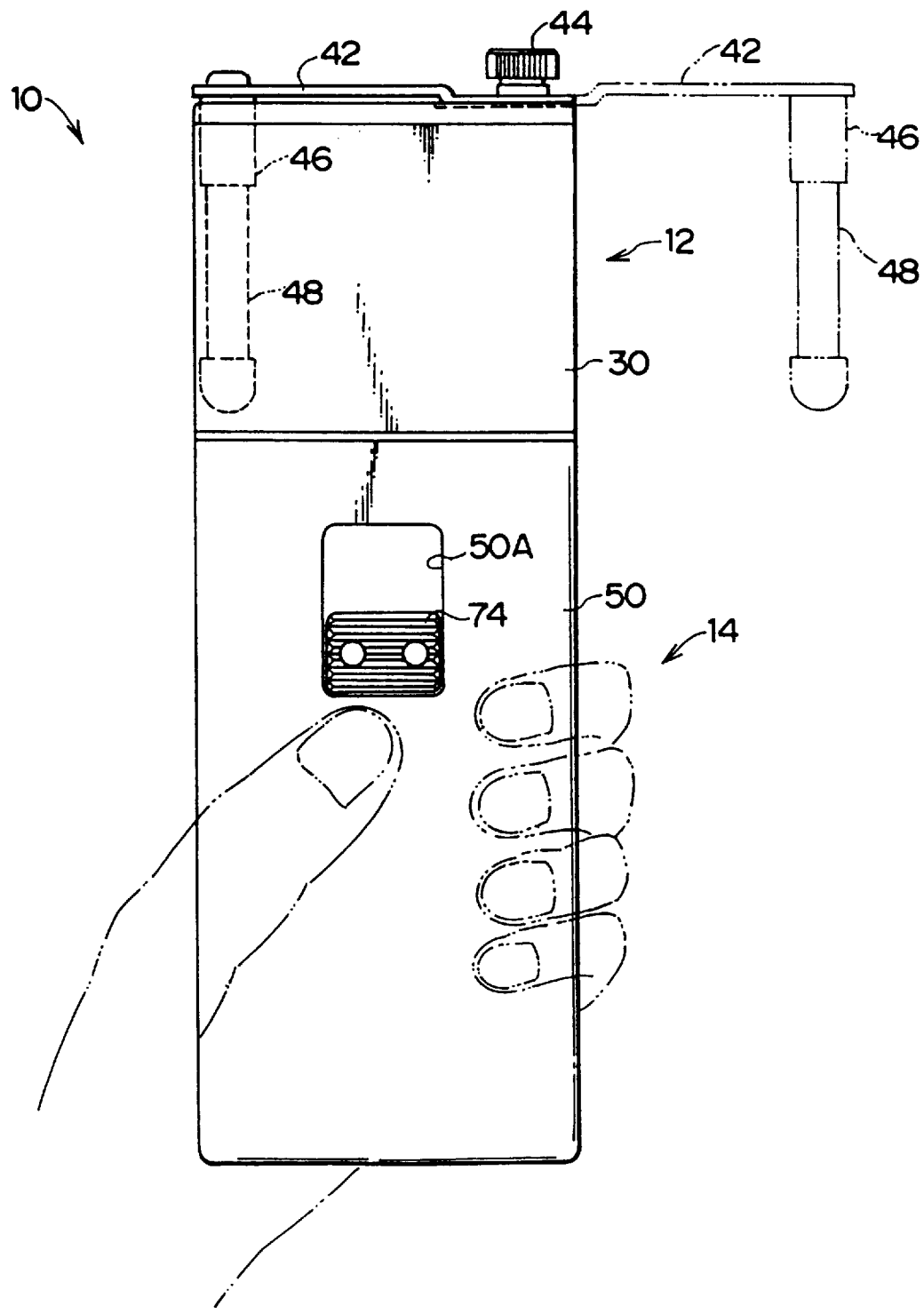
FIG. 4 is a schematic front view of the film winder when seen from a side of a cover.

Meanwhile, as shown in FIGS. 3A, 3B and 5, a concave portion 28A is formed in the casing 28 of the cartridge loading portion 12 on the other of the facing side surfaces which cross the direction of the thickness of the cartridge loading portion 12 at right angles. The guide bar 46 formed at the end of the arm 42 is inserted into the concave portion 28A of the casing 28 when the screw 44 is loosened so as to swing the arm 42. For this reason, as shown in FIG. 4, when the film winder 10 is not used, the guide bar 46 projecting from the cartridge loading portion 12 is accommodated in the concave portion 28A and such a projection from the cartridge loading portion 12 can be eliminated.

As shown in FIG. 2, the base portion 14 is formed by a casing 50 of which interior is formed hollow. The casing 50 is of a size such that it can be held by a hand (see FIG. 4).

A pair of brackets 52, 54 serving as a driving member holding member are provided in an interior of the casing 50 along the longitudinal direction of the casing 50. Elongated holes 56 are respectively formed in the pair of brackets 52, 54 in vicinities of respective one ends of the brackets near the cartridge loading portion 12 and elongated holes 58 are respectively formed in the brackets 52, 54 at other ends of the brackets (in FIG. 2, these holes are respectively shown in section). A motor unit 60 serving as a driving member is disposed between the pair of brackets 52, 54.

The motor unit 60 is constructed such that a motor 64 and a battery 66 are mounted to a base plate 62. The base plate 62 includes leg portions 62A which are respectively bent to face the elongated holes 56, 58 formed in brackets 52, 54. Guide pins 68, 70 project from the leg portions 62A which face the elongated holes 56 and are inserted into the elongated holes 56. Further, guide rollers 72 are mounted to the leg portions 62A which face the elongated holes 58 and are inserted into the elongated holes 58.

The motor unit 60 is supported between the pair of brackets 52, 54 by these guide pins 68, 70 and guide rollers 72, and the guide pins 68, 70 and the guide rollers 72 are moved along the axial direction of these elongated holes 56, 58. As a result, the motor unit 60 is provided to be slidable toward the cartridge loading portion 12 (which is indicated by the two-dot chain line in FIG. 2) and in the direction opposite to that of the cartridge loading portion 12 (which is indicated by the solid line in FIG. 2).

As shown in FIG. 1, a rectangle-shaped hole 50A is formed on an upper surface of the casing 50 of the base portion 14, which is disposed on the same plane as that of the cover 30. A slide switch 74 serving as a moving member is provided to be slidable within the rectangle-shaped hole 50A. The slide switch 74 is connected to the base plate 62 of the above-described motor unit 60 and the motor unit 60 is provided to slide with a sliding operation of the slide switch 74 toward the side of the cartridge loading potion 12 (indicated by the two-dot chain line in FIG. 2) and in the direction opposite to that of the cartridge loading portion 12.

One end of an extension coil spring 76 serving as an urging member is engaged with the guide pin 70 inserted in the elongated hole 56 of the bracket 54 at an end of the guide pin 70 projecting from the elongated hole 56. A pin 78 with which another end of the extension coil spring 76 is engaged is mounted to another end portion of the bracket 54 which is not disposed on the side of the cartridge loading portion 12. The extension coil spring 76 is provided to urge the motor unit 60 in the direction opposite to that of the cartridge loading portion 12. For this reason, by releasing the slide switch 74 slided toward the cartridge loading portion 12, the slide switch 74 is provided to return, together with the motor unit 60, in the direction opposite to that of the cartridge loading portion 12 by the urging force of the extension coil spring 76.

The bracket 52 is provided with a switch box 80 between the elongated holes 56, 58 and a pin 82 is formed to project from the guide roller 72 disposed on the side of the bracket 52. The pin 82 is provided to abut against and press on an operating portion 80A projecting from the switch box 80 by movement of the motor unit 60 toward the cartridge loading portion 12. When the operating portion 80A is pressed by the pin 82, the switch box 80 is provided to electrically connect the battery 66 and the motor 64 to each other with an unillustrated internal contact point being closed, so as to drive the motor 64.

Meanwhile, a driving shaft 84 of the motor 64 is rotatably supported by a slide bearing 86 of which intermediate portion is provided between the pair of brackets 52, 54. Further, a drive shaft 88 is mounted at a leading end of the driving shaft 84. When the motor unit 60 is moved toward the cartridge loading portion 12, the drive shaft 88 projects from the casing 50 into the casing 28 of the cartridge loading portion 12, is inserted into the end portion 22 (see FIG. 1) of the spool shaft 20, which is exposed to the exterior of the cartridge 18, and is engaged with the spool shaft 20 so as to be integrally rotatable therewith. When the spool shaft 20 is held between the shaft 32 and the drive shaft 88, the cartridge 18 provided in the casing 28 is fixed therein.

At this time, the pin 82 of the motor unit 60 operates to press on the operating portion 80A of the switch box 80 to drive the motor 64. The driving force of the motor 64 is transmitted to the spool shaft 20 in the cartridge 18 via the drive shaft 88 and rotates the spool shaft 20 in a direction in which the negative film is wound (i.e., the direction indicated by arrow B in FIG. 1) accordingly.

Meanwhile, as shown in FIGS. 1 and 2, a power source jack 90 is provided on the casing 50 of the base portion 14 at one of the facing side surfaces which is disposed perpendicular to the longitudinal direction of the film winder 10. The power source jack 90 is provided such that a pin plug 92 connected to an unillustrated power source which supplies direct power having a predetermined voltage can be inserted therein. The film winder 10 uses direct power supplied via the pin plug 92 as an external power source to actuate the motor 64 and allows charging of the battery 66.

Next, an operation of the film winder 10 applied to the embodiment of the present invention will be described.

When the negative film 16 which has been pulled out from the cartridge 18 is to be wound around the spool shaft 20 and accommodated within the cartridge 18, the cover 30 of the cartridge loading portion 12 of the film winder 10 is opened and the cartridge 18 is loaded in the cartridge loading portion 12. At this time, the guide bar 46 accommodated in the concave portion 28A of the casing 28 is pulled out therefrom by rotating the arm 42 and the guide bar 46 is in advance brought into a state of facing the insertion opening 36 of the cartridge loading portion 12. Further, when the cartridge 18 is loaded in the interior of the casing 28, the shaft 32 in the casing 28 is inserted into the end portion 22 of the spool shaft 20.

Thereafter, the intermediate portion in the longitudinal direction of the negative film 16 pulled out from the cartridge 18 is disposed on the stepped portion 34 of the casing 28 and the leading end portion of the negative film 16 is entrained around the guide portion 48 of the guide bar 46. At this time, the negative film 16 is usually accommodated within the cartridge 18 in such a manner as to be wound around the spool shaft 20 in layers and curling is generated in the negative film 16. For this reason, the leading end portion of the negative film 16 pulled out from the cartridge 18 is set in a curling state.

When the curled leading end portion of the negative film 16 is entrained around the guide bar 46, the curling portion of the negative film 16 may hang from the guide bar 46 as shown in FIG. 3A, or the guide bar 46 may be inserted in an axial center of the curling portion as shown in FIG. 3B.

Subsequently, the casing 28 is closed by the cover 30. As a result, the both end portions in the transverse direction of the negative film 16 are nipped between the feed rollers 38, 40 provided in the insertion opening 36 and the negative film 16 is suspended in the air between the casing 28 and the cover 30, thereby preventing the surface of the negative film 16 from contacting the casing 28 at a peripheral edge of the insertion opening 36, or the cover 30.

When the slide switch 74 provided in the casing 50 of the base portion 14 is operated in the above-described state, the film winder 10 starts winding the negative film 16. Namely, when the slide switch 74 is slid toward the cartridge loading portion 12, the motor unit 60 moves and the drive shaft 88 is inserted into and engaged with the spool shaft 20 of the cartridge 18 within the casing 28 of the cartridge loading portion 12, and at the same time, the drive shaft 88 holds the spool shaft 20 between the shaft 32 and the drive shaft 88 so as to fix the cartridge 18.

Meanwhile, when the motor unit 60 is moved toward the cartridge loading portion 12 by the sliding operation of the slide switch 74, the pin 82 presses on the operating portion 80A of the switch box 80 to actuate the motor 64. When the motor 64 is actuated, the spool shaft 20 rotates in the direction in which the negative film 16 is wound (i.e., the direction of arrow B in FIG. 1) so as to be integral with the drive shaft 88 which rotates by the driving force of the motor 64 and the negative film 16 is accordingly wound around the spool shaft 20 while being inserted from the insertion opening 36 of the cartridge loading portion 12 into the cartridge 18.

At this time, the curling portion of the negative film 16 is caught by the guide bar 46 and the movement of the negative film 16 in the transverse direction thereof is limited between diameter-enlarged portions of the guide portion 48 at both ends thereof. For this reason, the negative film 16 can be pulled into the casing 28 from the insertion opening 36 in a smooth manner with no waved portion generated therein and in such a state that the surface of the negative film 16 does not scrape against other components. The feed rollers 38, 40 provided in the insertion opening 36 hold the negative film 16 and rotate with the movement of the negative film 16, so that tensile force can be lightly and uniformly applied to the negative film 16 inserted from the insertion opening 36 into the insertion opening 24 of the cartridge 18 so as to be wound around the spool shaft 20. As a result, there is no possibility that a slack portion or a tightened portion is formed in the negative film 16 wound around the spool shaft 20.

Meanwhile, it should be noted that, in place of the feed rollers 38, 40, a flocked fiber cloth such as chemical fiber, animal fiber and vegetable fiber, in which soft staples project, may be used. Alternatively, an elastic member such as sponge, rubber or the like, which does not damage the surface of the negative film 16 which it contacts, may be used to form a guide.

After the negative film 16 has been wound around the spool shaft 20 of the cartridge 18, when the slide switch 74 is released, the motor unit 60 is returned to its original position (i.e., the position apart from the cartridge loading portion 12) by the urging force of the extension coil spring 76 and the motor 64 stops driving, and at the same time, the drive shaft 88 retracts into the casing 50 of the base portion 14. Subsequently, when the cover 30 is opened, the cartridge 18 in which the negative film 16 is wound up and accommodated can be taken out from the casing 28. Meanwhile, the insertion opening 24 of the cartridge 18 is closed by a predetermined instrument.

After winding of the negative film 16 into the cartridge 18 has been completed, by loosening the screw 44 to swing the arm 42, the guide bar 46 projecting from the cartridge loading portion 12 is accommodated in the concave portion 28A of the casing 28. As a result, the film winder 10 is formed into a rectangular box-shaped configuration made of the casing 28 and the casing 50 having no projecting portion and is thereby extremely easy to carry and store (see FIGS. 3A, 3B, 4 and 5).

In the foregoing, there was described the film winder 10 only having a function of winding the negative film 16 in the cartridge 18. However, it is also possible to pull out the negative film 16 from the cartridge 18.

FIG. 6 shows a film winder 100. The film winder 100 is basically of the same structure as that of the film winder 10, in which a change-over switch 102 is provided adjacent to the slide switch 74. The change-over switch 102 is used to operate the film winder 100 in a "winding" position (i.e., the position shown in FIG. 6) in the same way as the film winder 10. Further, by effecting the sliding operation of the slide switch 74 with the change-over switch 102 being set at a "pull-out" position (i.e., the position at which the switch is changed from the position shown in FIG. 6 to the side of the cartridge loading portion 12), the drive shaft 88 (not shown in FIG. 6) can be reversely rotated for a predetermined time.

The above-described winding operation is effected when the negative film 16 has been pulled out from the cartridge 18. At this time, after the cartridge 18 with the insertion opening 24 being open is loaded in the cartridge loading portion 12 and the change-over switch 102 is changed to the "push-out" position, the slide switch 74 is slid toward the cartridge loading portion 12.

In this way, the film winder 100 is provided to drive the motor 64 with the drive shaft 88 being engaged with the spool shaft 20 of the cartridge 18. However, when the motor 64 rotates reversely to rotate the spool shaft 20 in the direction opposite to that of arrow B (see FIG. 1), the leading end of the negative film 16 wound around the spool shaft 20 in layers is pushed out from the insertion opening 24 of the cartridge 18. Accordingly, the leading end of the negative film 16 pushed out from the insertion opening 24 of the cartridge 18 is conveyed from the insertion opening 36 of the cartridge loading portion 12 to the exterior of the casing 28.

Subsequently, when the cartridge 18 is removed from the film winder 100, the leading end of the negative film 16 is exposed from the cartridge 18. Accordingly, the negative film 16 can subsequently be easily pulled out from the cartridge 18 by a predetermined amount (i.e., to a position of a desired image frame).

After having driven for a fixed time, the motor 64 stops driving regardless of the position of the slide switch 74. For this reason, the negative film 16 stops with the leading end thereof being sent out from the cartridge 18. As a result, it is possible to prevent inconveniences such that the negative film 16 is pushed out from the cartridge by a large amount, or that the spool shaft 20 is further driven in a state in which the negative film 16 is pushed out to its full length.

The above-described film winder is an example of the film winding device to which the present invention is applied, and the present invention is not limited to the same.

The rectangle-shaped casing 50 is used for the base portion 14. However, the casing 50 may be, for example, formed in the shape of a cylinder or formed so as to be easy to hold by providing smooth irregularities on the external surface of the casing. Further, when winding of the negative film 16 into the cartridge 18 has been completed, a mechanism may be added which closes the insertion opening 36 by an unillustrated door with the door shaft 26 being rotated.

Further, detection means may be provided which detects whether or not the negative film 16 exists in the insertion opening 36 of the cartridge loading portion 12. As the detection means, there may be used a non-contact sensor such as a photo-electric sensor or the like, which detects, on the basis of intensity of light, whether the negative film 16 exists, or a contact or mechanical switch such as a limit switch, in which a contact point is changed by contacting the negative film 16.

When the above-described detection means is provided in the film winder, for example, when winding of the negative film 16 into the cartridge 18 has been completed, the motor 64 can be automatically stopped. Further, if the film winder has a function of pushing out the negative film 16 from the cartridge 18, the motor 64 can be stopped in the state in which the leading end of the negative film 16 comes out from the cartridge 18. Accordingly, it is possible to prevent excessive of the spool shaft 20, which causes the negative film 16 to be further sent out from the cartridge 18.

What is claimed is:

1. A film winding device for winding a developed photographic film at least one of into and out of a film cartridge that includes an insertion opening and a spool shaft on which the film is wound and unwound, comprising:

cartridge loading means for holding the film cartridge;

a guide bar for facing the insertion opening of the film cartridge when the film cartridge is loaded in said cartridge loading means and for entraining the developed photographic film as the film is at least one of wound into and unwound out from the film cartridge;

a connecting member connecting said guide bar to said cartridge loading means so that said guide bar is pivotable with respect to said cartridge loading means, wherein said guide bar pivots into and out of said cartridge loading means and remains parallel to a long central axis of said cartridge loading means and a base portion which is integrally connected to said cartridge loading means;

a driving member for rotating the spool shaft of the film cartridge when said film cartridge is loaded in said cartridge loading means so as to, at least one of wind and unwind the developed photographic film into and out of the film cartridge; and a drive shaft for engaging the spool shaft of the film cartridge by projecting into said cartridge loading means, for holding the film cartridge at a predetermined position within said cartridge loading means, and for transmitting a driving force of said driving member to the spool shaft; and said base portion having a casing for accommodating said driving member, said base portion having a slide switch connected to said driving member, said slide switch moving said driving member in a direction along an axis of said drive shaft to a position where said driving member operates.

2. A film winding device according to claim 1, further comprising:

a drive switching member for causing said driving member to rotate in a reverse direction for a predetermined time.

3. A film winding device according to claim 1, wherein said connecting member has a screw member for holding said guide bar at a predetermined position.

4. A film winding device according to claim 1, wherein said base portion has a driving-member holding member in an interior of the casing, said driving-member holding member holding said driving member such that said driving member is movable in the direction along the axis of the drive shaft.

5. A film winding device according to claim 1, wherein said base portion has a spring member for urging said driving member and said drive shaft in a direction moving away from said cartridge loading means.

6. A film winding device according to claim 1, wherein said cartridge loading means has a concave portion for accommodating said guide bar.

7. A film winding device according to claim 1, wherein said cartridge loading means has a film holding member for holding outer peripheral portions of the developed photographic film, at least one of pulled out from and inserted into the insertion opening of the film cartridge.

8. A film winding device according to claim 1, wherein said driving member has a battery for storing power supplied from an exterior source.

9. A film winding device according to claim 1, wherein said cartridge loading means is separate from any camera.

* * * * *

UNITED STATES PATENT AND TRADEMARK OFFICE
CERTIFICATE OF CORRECTION

PATENT NO.: 5,868,341
DATED: February 9, 1999
INVENTOR(S): YANAGIMOTO, TAKEKAZU

It is certified that error(s) appears in the above-identified patent and that said Letters Patent is hereby corrected as shown below:

On the title page,
Item No. [56], References Cited, the following data was omitted:

--FOREIGN PATENT DOCUMENTS 2146036   3/1973   Fed. Rep. of Germany   242/348 --.

Signed and Sealed this

Twenty-eighth Day of September, 1999

*Attest:*

Q. TODD DICKINSON

*Attesting Officer*    *Acting Commissioner of Patents and Trademarks*